United States Patent Office 2,957,878
Patented Oct. 25, 1960

2,957,878

18-O-ESTERS OF METHYL RESERPATE

Robert Armistead Lucas, Mendham, N.J., assignor to Ciba Pharmaceutical Products Inc., Summit, N.J., a corporation of New Jersey No Drawing. Filed June 4, 1957, Ser. No. 663,350

6 Claims. (Cl. 260—287)

The present invention relates to a new series of diesters of reserpic acid and the salts of such compounds. Reserpine, an alkaloid originally isolated from plant material of various Rauwolfia species such a *Rauwolfia serpentina, Rauwolfia vomitoria, Rauwolfia canescens,* etc., is a widely distributed drug having hypotensive and sedative action, and was found to be an ester alkaloid, containing an esterified carboxyl and hydroxyl group (Dorfman et al. Helv. Chim. Acta, vol. 37, page 59 (1954)). Upon mild hydrolysis e.g. methanolysis with sodium methylate in methanol as described in U.S. Patent No. 2,786,844 by MacPhillamy and Huebner, issued March 26, 1957, 3,4,5-trimethoxy-benzoic acid may be split off and methyl reserpate of the formula:

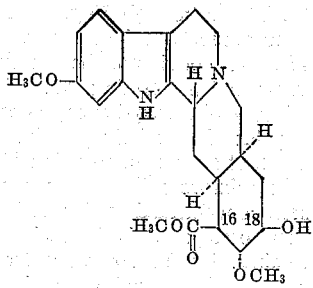

can be isolated. Further hydrolysis of this monoester with a strong alkaline reagent, e.g. sodium hydroxide in ethanol yields the free reserpic acid, which may also be obtained directly by treatment of reserpine with a strong alkaline reagent. Upon reesterification of reserpic acid and/or methyl reserpate synthetic diesters have been prepared which differ chemically from reserpine with respect to esterification of the 16-carboxyl and/or the 18-hydroxyl group.

It has now been found that the new 18-O-esters of methyl reserpate of this invention and the salts thereof differ from reserpine and similar esters in regard to their pharmacological behaviour. Thus, the new esters of this invention show a pronounced hypotensive activity, but the sedative and miotic effect, which is pronounced in reserpine, is to a large degree absent. Therefore, the new synthetic esters of methyl reserpate can be used as hypotensive agents without causing sedative and tranquilizing side effects.

Chemically the new esters of the present invention have the following formula:

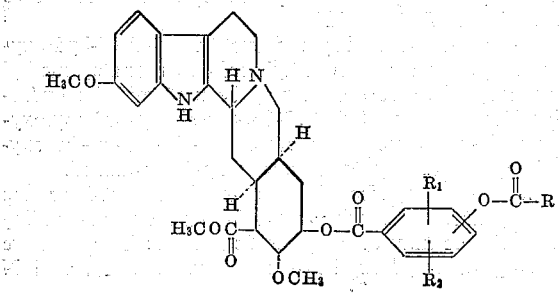

in which R stands for a lower alkyl or a lower alkoxy group, $R_1$ for hydrogen, a lower alkoxy, lower alkylcarbonyloxy or a lower alkoxy-carbonyloxy group and $R_2$ for hydrogen, a lower alkyl-carbonyloxy or a lower alkoxy-carbonyloxy group. Lower alkyl radicals, also those of lower alkoxy, lower alkyl-carbonyloxy or lower alkoxy-carbonyloxy groups contain from 1 to 7 carbon atoms, e.g. propyl, isopropyl or butyl or especially methyl or ethyl. Representative of the new series is, for example, the compound of the formula:

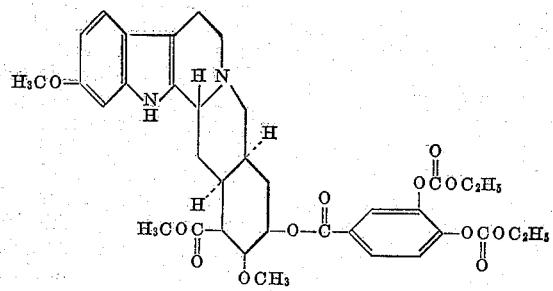

and the salts thereof.

Salts of the new diesters are especially therapeutically useful acid addition salts such as those formed with inorganic acids, e.g. hydrochloric, hydrobromic, phosphoric, sulfuric or thiocyanic acid; or with organic acids, e.g. acetic, propionic, succinic, maleic, malic, tartaric, citric or the like.

The new esters may be prepared by reacting methyl reserpate or a salt thereof with a derivative of an acyloxybenzoic acid of the formula:

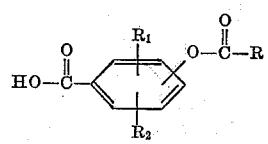

in which R, $R_1$ and $R_2$ have the above-given meaning, capable of forming an ester linkage of the acid with the 18-hydroxyl group of methyl reserpate, and, if desired, converting any esterified hydroxyl group attached to the benzoyl portion into a free hydroxyl group, and, if desired, converting any free hydroxyl group, which may be formed by hydrolysis, into a lower alkyl-carbonyloxy or lower alkoxy-carbonyloxy group, and/or, if desired, converting any resulting salt into the free base, and/or, converting any resulting free base into a salt thereof.

Salts of methyl reserpate are especially addition salts with acids, e.g. those outlined hereinbefore.

Derivatives of an acyloxy-benzoic acid such as outlined above capable of forming an ester linkage with the 18-hydroxy group of methyl reserpate are especially the corresponding acid halides, e.g. chlorides or bromides; or the corresponding anhydrides. Furthermore, in a transesterification reaction esters of the above acids may also be used, especially those with lower alkanols, e.g. methanol, ethanol, or propanol.

The reaction is preferably performed in the presence of an acid neutralizing agent such as, for example, a liquid organic base, e.g. pyridine, collidine or lutidine or the like. In lieu of an organic base, alkali metal carbonates, e.g. sodium carbonate or potassium hydrogen carbonate may be employed. The organic base may, at the same time, serve as a diluent; however, other organic solvents such as benzene, toluene or hexane may be used for that purpose. The reaction may be carried out at an elevated temperature; however, the highest yields are achieved if the esterification is performed at temperatures ranging from −10° C. to room temperature. If necessary, the reaction may be run in a closed vessel under pressure and/or in an atmosphere of an inert gas, e.g.

nitrogen. Preferably, pyridine is used as the diluent and cooling of the reaction vessel is advisable, although not absolutely necessary.

The invention also comprises any modification of the general process wherein a compound obtainable as an intermediate at any stage of the process is used as starting material and the remaining step(s) of the process are carried out, as well as any new intermediates. Due to the inability of certain of the diesters such as, for example, certain lower alkoxy-carbonyloxy-benzoates of methyl reserpate, to crystallize readily from a crude reaction product it is often advisable to split the easily hydrolyzable ester groups such as the lower alkoxy-carbonyloxy groups, with a mild hydrolytic reagent such as, for example, aqueous ammonia. Such a partial hydrolysis may also occur during the esterification of methyl reserpate with an esterified hydroxy-benzoic acid derivative. The thus obtained benzoates containing a free hydroxyl group are then purified by crystallization and re-esterified by reaction with a derivative of a lower alkane- or lower alkoxy-carboxylic acid capable of forming an ester linkage of such an acid with a phenolic hydroxyl group, especially an acid halide, e.g. chloride, of such acids. The re-esterification is carried out under the same or similar conditions as described hereinbefore, preferably in a diluent, such as an aromatic hydrocarbon, e.g. benzene or toluene, and in the presence of a liquid organic base, e.g. pyridine or collidine.

Therefore, the present invention also includes the conversion of O-esterified methyl reserpates of the formula:

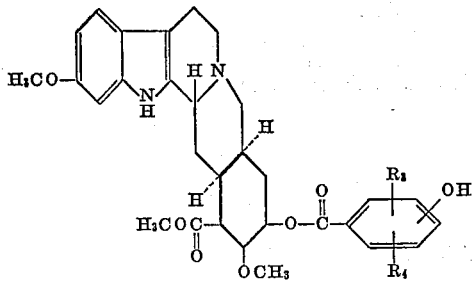

in which $R_3$ stands for hydrogen, a hydroxyl or a lower alkoxy group and $R_4$ for a hydrogen or a hydroxyl group, or a salt thereof, into the diesters of reserpic acid of the formula:

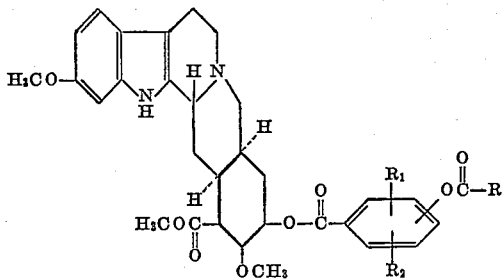

in which R, $R_1$ and $R_2$ have the above-given meaning or a salt thereof by way of the above-outlined procedure.

Depending on the conditions used, the new intermediate compounds are obtained in the form of the free bases or salts thereof. A salt may be converted into the free base by treating the salt with a mild alkaline reagent, which does not bring about hydrolysis of the diester. Preferred is, for example, the treatment with silver carbonate. The free bases may be transformed into their therapeutically useful acid addition salts by reaction with the appropriate inorganic or organic acids, such as, the acids outlined above, for example in an alcoholic, e.g. methanolic or ethanolic solution.

The derivatives of acids used as the starting materials in the process of this invention described are known or may be prepared according to methods known for the preparation of analogous derivatives. Thus, an acid halide, for example may be prepared by reaction of the free acid with a thionylhalide, e.g. thionyl chloride.

The following examples are intended to illustrate the invention. They are not to be construed as being limitations thereon. Temperatures are given in degrees centigrade.

*Example 1*

The mixture of 18 g. of 4-ethoxycarbonyloxy-benzoic acid and 65 ml. of thionyl chloride is refluxed for one hour and the excess of thionylchloride is removed under reduced pressure. The last traces of the halogenating reagent are taken off by keeping the reaction product over phosphorus pentoxide and silica gel under reduced pressure.

The thus formed acid chloride is added to a solution of 8 g. of methyl reserpate in 60 ml. of pyridine (dried over calcium hydride) while cooling with ice water. The reaction flask is kept in the refrigerator for four days, after which the excess of pyridine is evaporated under reduced pressure at a temperature not exceeding 55°. The residue is dissolved in 400 ml. of chloroform and the organic layer is successively washed with three portions of 400 ml. of 2% aqueous hydrochloric acid, one portion of 400 ml. of water, two portions of 400 ml. of 2% aqueous potassium hydroxide and one portion of 400 ml. of water and then dried over sodium sulfate. The chloroform is evaporated under reduced pressure, the residue dissolved in a mixture of methylene chloride and ether (2:1), filtered through 50 g. of Florex (a magnesio-silica gel adsorbent), and the solvent evaporated. Direct crystallization could not be obtained from a variety of solvents and the crude product is hydrolyzed to the methyl 18-O-(4-hydroxy-benzoyl)-reserpate.

The crude product is partially dissolved in 150 ml. of ethanol, 100 ml. of aqueous ammonia of 28% strength is added and the mixture refluxed for one hour. The solution is then concentrated under reduced pressure until a solid tan precipitate is formed. Several such precipitates, obtained by further concentration, yield a total of about 5 g. of material which is recrystallized once from ethanol and then from a mixture of ethanol and methylene chloride. 2.2 g. of the white crystalline methyl 18-O-(4-hydroxy-benzoyl)-reserpate is obtained, M.P. 249–252°.

A mixture of 1 g. of the methyl 18-O-(4-hydroxy-benzoyl)-reserpate, 2 ml. of ethyl chlorocarbonate and 2 ml. of pyridine in 50 ml. of benzene is refluxed for 10 minutes and then cooled to room temperature. After standing for one hour the solvents are evaporated under reduced pressure and the residue washed with water, then with ether and air-dried on a Buchner funnel, to yield the hydrochloride of the methyl 18-O-(4-ethoxy-carbonyloxy-benzoyl)-reserpate.

The hydrochloride is converted to the free base by dissolving the hydrochloride salt in 50 ml. of methanol and stirring the solution with 1 g. of silver carbonate. The mixture is filtered through Filter Cel (a diatomaceous earth), the solvent is evaporated under reduced pressure and the residue precipitated from a mixture of ethyl acetate and petroleum ether. The methyl 18-O-(4-ethoxy-carbonyloxy-benzoyl)-reserpate is obtained as a powder, M.P. 180–182°.

Instead of esterifying the methyl 18-O-(4-hydroxy-benzoyl)-reserpate with ethyl chlorocarbonate, methyl or n-butyl chlorocarbonate may be used and the hydrochlorides of methyl 18-O-(4-methoxy-carbonyloxy-benzoyl)-reserpate or methyl 18-O-(4-n-butoxycarbonyloxy-benzoyl)-reserpate may be obtained.

The 4-ethoxy-carbonyloxy-benzoic acid used as the starting material for the preparation of the corresponding acid chloride may be prepared as follows: To a mixture of 69 g. of 4-hydroxy-benzoic acid in 1300 ml. of 1 N aqueous sodium hydroxide is added 78 ml. of ethyl chlorocarbonate at −1° over a period of 1½ hours. The temperature is then allowed to rise to 5° and the solution is acidified with dilute aqueous hydrochloric acid (of about 20% strength) to a pH of about 1 to 2, whereupon a white precipitate is formed. The 4-ethoxy-carbonyloxy-benzoic acid is filtered off, washed with water and dried, M.P. 139–143°.

*Example 2*

A mixture of 0.4 g. of the methyl 18-O-(4-hydroxy-benzoyl)-reserpate obtained according to the procedure described in Example 1, 25 ml. of benzene, 3 ml. of pyridine and 3 ml. of acetic acid anhydride is refluxed for 5 minutes and then let stand at room temperature for one-half hour. The solvents are evaporated under reduced pressure and the residue taken up in ethanol. The resulting gel is redried, crystallized from acetone, washed with ether, and the thus obtained methyl 18-O-(4-acetoxy-benzoyl)-reserpate melts at 216–219°.

*Example 3*

A mixture of 1 g. of methyl 18-O-(3,4-dihydroxy-benzoyl)-reserpate, 3 ml. of ethyl chlorocarbonate, 3 ml. of pyridine and 50 ml. of benzene is refluxed for 10 minutes and then let stand for one-half hour. The solvents are evaporated under reduced pressure, the residue triturated with water and the yellow powder filtered off, washed with water, then with ether and dried. The resulting hydrochloride is dissolved in 50 ml. of methanol, slurried with 1 g. of silver carbonate and the mixture filtered through Filter Cel. Upon evaporation a powder is obtained which is precipitated from a mixture of ethyl acetate and petroleum ether. Upon standing the methyl 18 - O - (3,4 - bis - ethoxy - carbonyloxy - benzoyl) - reserpate, crystallizes, M.P. 162–164°

The methyl 18-O-(3,4-dihydroxy-benzoyl)-reserpate used as the starting material may be obtained according to the general procedure outlined in Example 1, by converting the 3,4-bis-ethoxy-carbonyloxy-benzoic acid, M.P. 112–116°, into its acid chloride by reaction with thionylchloride, reacting the acid chloride with methyl reserpate and hydrolyzing the non-crystallizable, crude diester with aqueous ammonia. The methyl 18-O-(3,4-dihydroxy - benzoyl) - reserpate is recrystallized from a mixture of acetone and petroleum ether, M.P. 218–220°.

*Example 4*

A mixture of 8 g. of methyl reserpate and the 2,5-bis-ethoxy-carbonyloxy-benzoic acid chloride obtained from the reaction of 25 g. of the corresponding acid with thionyl chloride according to the procedure described in Example 1, in pyridine is treated as described in Example 1. The non-crystallizable product is partially hydrolyzed by heating a solution thereof in 75 ml. ethanol and 75 ml. aqueous ammonia for 30 minutes. The gum, formed by concentrating the solution is washed with water and the powder thus obtained is twice precipitated from a mixture of ethyl acetate and petroleum ether. The methyl 18-O-(2,5-dihydroxy-benzoyl)-reserpate melts at 180–185°.

1.5 g. of the methyl 18-O-(2,5-dihydroxy-benzoyl)-reserpate, is added to 75 ml. of benzene and 5 ml. of pyridine, 5 ml. of ethyl chlorocarbonate is added and the mixture is refluxed for 10 minutes. After several hours standing at room temperature the solvents are evaporated under reduced pressure and the gummy residue is triturated with water, whereupon it solidifies and can be filtered off. After washing with water and ether and drying, the resulting hydrochloride salt is dissolved in 50 ml. of methanol and slurried with 1 g. of silver carbonate. The solution is filtered, the solvent evaporated under reduced pressure and the residue precipitated from a mixture of ethyl acetate and excess petroleum ether. The solid is dissolved in a mixture of ethyl acetate and petroleum ether (2:1), filtered through Florex and reprecipitated from ethyl acetate plus excess petroleum ether. About 1 g. of the methyl 18-O-(2,5-bis-ethoxy-carbonyloxy-benzoyl)-reserpate, is obtained as a powder which upon standing crystallizes, M.P. 140–145°.

The 2,5-bis-ethoxy-carbonyloxy-benzoic acid, the acid chloride of which is used as the starting material is obtained as follows: 40 g. of the 2,5-dihydroxy-benzoic acid is dissolved in 1000 ml. of 1 N aqueous sodium hydroxide and over a period of 1 hour 67 g. of ethyl chlorocarbonate is added to the solution at a temperature of −1°, and stirred for an additional two hours. The PH is adjusted to 1–2 by the addition of dilute aqueous hydrochloric acid, and the precipitated 5-ethoxy-carbonyloxy-2-hydroxy-benzoic acid is filtered off and washed with water, M.P. 110–112°.

10 g. of the 5-ethoxy-carbonyloxy-2-hydroxy-benzoic acid is dissolved in a mixture of 50 ml. of benzene and 17 ml. of dimethylaniline. A total of 4.6 ml. of ethyl chlorocarbonate is added during a period of one hour in portions of about 0.9 ml. in such a way that before each addition of the acid chloride the reaction mixture is frozen by cooling with a mixture of acetone and Dry Ice and is then allowed to melt at room temperature. The mixture is washed with two portions of 60 ml. of dilute aqueous hydrochloric acid of about 20% strength and the benzene layer is separated. The 2,5-bis-ethoxy-carbonyloxy-benzoic acid precipitates after two hours standing in the refrigerator and is filtered off and dried, M.P. 95–98°. It is directly used for the conversion into the acid chloride by reaction with thionyl chloride.

*Example 5*

A mixture of 8 g. of methyl reserpate and 3,5-bis-ethoxy-carbonyloxy-benzoic acid chloride obtained from 20 g. of the corresponding acid by reaction with thionyl chloride according to the procedure outlined in Example 1, in 60 ml. of pyridine is stored in the refrigerator for four days. After evaporation of the solvent under reduced pressure the resulting residue is dissolved in 600 ml. of chloroform and the chloroform solution is successively washed with three portions of 400 ml. of aqueous hydrochloric acid of 2% strength, one portion of 400 ml. of water, two portions of 400 ml. of aqueous potassium hydroxide of 2% strength and two portions of 400 ml. of water. The chloroform layer is dried over sodium sulfate, the solvent evaporated under reduced pressure in the foamy, oil-like residue dissolved in benzene. The solution is filtered through Florex, the diluent evaporated, the residue taken up in a mixture of methylene chloride and petroleum ether (1:2), filtered through a layer of alumina and a layer of Florex. The solvents are evaporated and the residue crystallized from a mixture of ethyl acetate and ether. The methyl 18-O-(3,5-bis-ethoxy-carbonyloxy-benzoyl)-reserpate is filtered off and washed with ether, M.P. 200–206°.

What is claim is:

1. A member of the group consisting of esters of methyl reserpate of the formula:

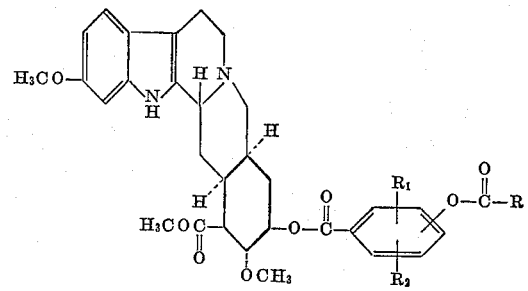

in which R stands for a member of the group consisting of lower alkyl and lower alkoxy, $R_1$ for a member of the group consisting of hydrogen, lower alkoxy, lower alkyl-carbonyloxy and lower alkoxy-carbonyloxy and $R_2$ for a member of the group consisting of hydrogen, lower alkyl-carbonyloxy and lower alkoxy-carbonyloxy, and therapeutically useful salts of such esters.

2. Methyl 18-O-(4-ethoxy-carbonyloxy-benzoyl)-reserpate.

3. Methyl 18-O-(4-acetoxy-benzoyl)-reserpate.

4. Methyl 18-O-(3,4-bis-ethoxy-carbonyloxy-benzoyl)-reserpate.

5. Methyl 18-O-(2,5-bis-ethoxy-carbonyloxy-benzoyl)-reserpate.

6. Methyl 18-O-(3,5-bis-ethoxy-carbonyloxy-benzoyl)-reserpate.

References Cited in the file of this patent

UNITED STATES PATENTS 2,789,113    Taylor _____ Apr. 16, 1957

FOREIGN PATENTS 744,290    Great Britain _____ Feb. 1, 1956